(12) United States Patent
Sansone

(10) Patent No.: US 6,538,757 B1
(45) Date of Patent: Mar. 25, 2003

(54) METHOD FOR AUTOMATICALLY READING ELECTRONIC TICKETS

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/575,314

(22) Filed: May 19, 2000

(51) Int. Cl.[7] .............................................. G06F 15/00
(52) U.S. Cl. ....................... 358/1.12; 358/1.1; 358/1.12; 358/296; 358/501; 399/225; 399/271; 705/26
(58) Field of Search ................................ 358/1.1, 1.12, 358/1.15, 296, 501; 399/271, 225; 382/100; 705/26; 380/51, 55; 785/26

(56) References Cited

U.S. PATENT DOCUMENTS

| | | | |
|---|---|---|---|
| 3,675,948 A | 7/1972 | Wicker ........................... 283/6 |
| 5,173,850 A | 12/1992 | Shimura et al. ............. 364/401 |
| 5,291,243 A | 3/1994 | Heckman et al. ............ 355/201 |
| 5,313,564 A | 5/1994 | Kafri et al. .................... 358/1.1 |
| 5,398,932 A | 3/1995 | Eberhardt et al. ....... 273/138 A |
| 5,444,518 A * | 8/1995 | Hashiguchi et al. ......... 399/271 |
| 5,598,477 A * | 1/1997 | Berson ......................... 380/51 |
| 5,682,819 A | 11/1997 | Beaty .......................... 101/483 |
| 5,735,547 A | 4/1998 | Morelle et al. ............... 283/67 |
| 5,769,458 A | 6/1998 | Carides et al. .............. 283/102 |
| 5,772,250 A | 6/1998 | Gasper ........................ 283/114 |
| 5,788,285 A | 8/1998 | Wicker ......................... 283/93 |
| 5,822,436 A | 10/1998 | Rhoads ......................... 380/54 |
| 5,853,197 A | 12/1998 | Mowry et al. ................. 283/91 |
| 5,995,638 A * | 11/1999 | Amidror et al. ............ 382/100 |
| 6,000,728 A | 12/1999 | Mowry ....................... 283/393 |
| 6,002,772 A | 12/1999 | Saito ............................ 380/49 |
| 6,050,606 A | 4/2000 | Foresti ......................... 283/93 |
| 6,103,353 A | 8/2000 | Gasper et al. .............. 428/195 |
| 6,142,533 A | 11/2000 | Borowski .................... 283/111 |
| 6,145,885 A | 11/2000 | Scrymgeour et al. ......... 283/94 |
| 6,155,491 A | 12/2000 | Dueker et al. .............. 235/486 |
| 6,223,166 B1 * | 4/2001 | Kay ............................. 705/26 |
| 6,229,621 B1 | 5/2001 | Kulakowski et al. ....... 358/1.15 |
| 6,240,396 B1 | 5/2001 | Walker et al. ................ 705/26 |
| 6,249,835 B1 | 6/2001 | Isoda .......................... 710/201 |
| 6,305,718 B1 | 10/2001 | Kendrick ..................... 283/93 |

* cited by examiner

Primary Examiner—Mark Wallerson
Assistant Examiner—Twyler Lamb
(74) Attorney, Agent, or Firm—Ronald Reichman; Angelo Chaclas

(57) ABSTRACT

An automatic method for reading a graphic field on a ticket so that the ticket may be processed quickly without human error. The graphic field is designed to produce a "tell", a visible known image (a large number of detectable halftone gray steps) when printed by a personal computer printer. Additionally, the graphic field will change in appearance when the ticket originally printed by the personal computer printer is digitally reproduced by either scanning or photo-copying.

17 Claims, 11 Drawing Sheets

METHOD FOR AUTOMATICALLY READING ELECTRONIC TICKETS

CROSS REFERENCE TO RELATED APPLICATIONS

Reference is made to commonly assigned copending patent application Ser. No. 09/575,312 filed herewith entitled "A Method For Issuing Electronic Tickets" in the name of Ronald P. Sansone; U.S. Pat. No. 6,373,587 entitled "A Method For Issuing Electronic Tickets" in the name of Ronald P. Sansone; and Ser. No. 09/573,364 filed herewith entitled "A Method For Reading Electronic Tickets" in the name of Ronald P. Sansone.

FIELD OF THE INVENTION

The subject invention relates to a method for printing tickets at remote locations and, more particularly, to printing readable tickets at remote locations.

BACKGROUND OF THE INVENTION

Tickets such as concert, theater, movie, museum, trade show, airline and sports tickets, etc, are documents having a substantial, intrinsic value which typically may be presented by any bearer to gain admittance or exercise an entitlement. Since such tickets may have substantial cash value, there exists a continuing problem of preventing the issuance of fraudulent tickets.

The issuance of many types of tickets, such as theater tickets, is currently controlled by means of controlled supplies (e.g. serialized ticket stock, specially printed ticket stock, etc.) and by allowing tickets to be issued only by controlled, authorized issuers (e.g. ticket agents). Controlled supplies are expensive, difficult to control, and prone to theft or counterfeiting. Typically, one stood in line to purchase a ticket at the place the event was being held or purchased the ticket over the phone from an authorized ticket agent who mailed the ticket to the purchaser.

Currently, ticketing companies are giving purchasers the option of printing their electronic tickets at home, using ordinary paper, a personal computer printer and an Internet connection. One of the problems in enabling people to print tickets at home is to ensure that counterfeit tickets are not used.

Another problem is to automatically check that the tickets are genuine.

SUMMARY OF THE INVENTION

This invention overcomes the disadvantages of the prior art by creating an automatic method for reading a graphic field on a ticket so that the ticket may be processed quickly without human error. The graphic field is designed to produce a "tell", a visible known image (a large number of detectable halftone gray steps) when printed by a personal computer printer. Additionally, the graphic field will change in appearance when the ticket originally printed by the personal computer printer is digitally reproduced by either scanning or photocopying.

The digital scanning and photocopying processes are degrading process that reduce the number of detectable half-tone gray steps produced in the copy. These processes also give rise to a pronounced mottle at the transition zone from white to black that does not exist in the original printed electronic ticket. The loss of some of the gray steps in the graphic field will indicate to a automated evaluation process that the reproduced ticket is counterfeit.

BRIEF DESCRIPTION OF THE DRAWINGS

FIG. 2 is a drawing of graphic field 21 or tell 21 of FIG. 1 and an enlarged version of graphic field 21 that becomes graphic field 21a;

FIG. 3 is a drawing showing graphic field 21a and segments 34, 35 and 36 that make up an enlarged version of graphic field 21a;

DETAILED DESCRIPTION OF A PREFERRED EMBODIMENTS OF THE INVENTION

Figure 1:
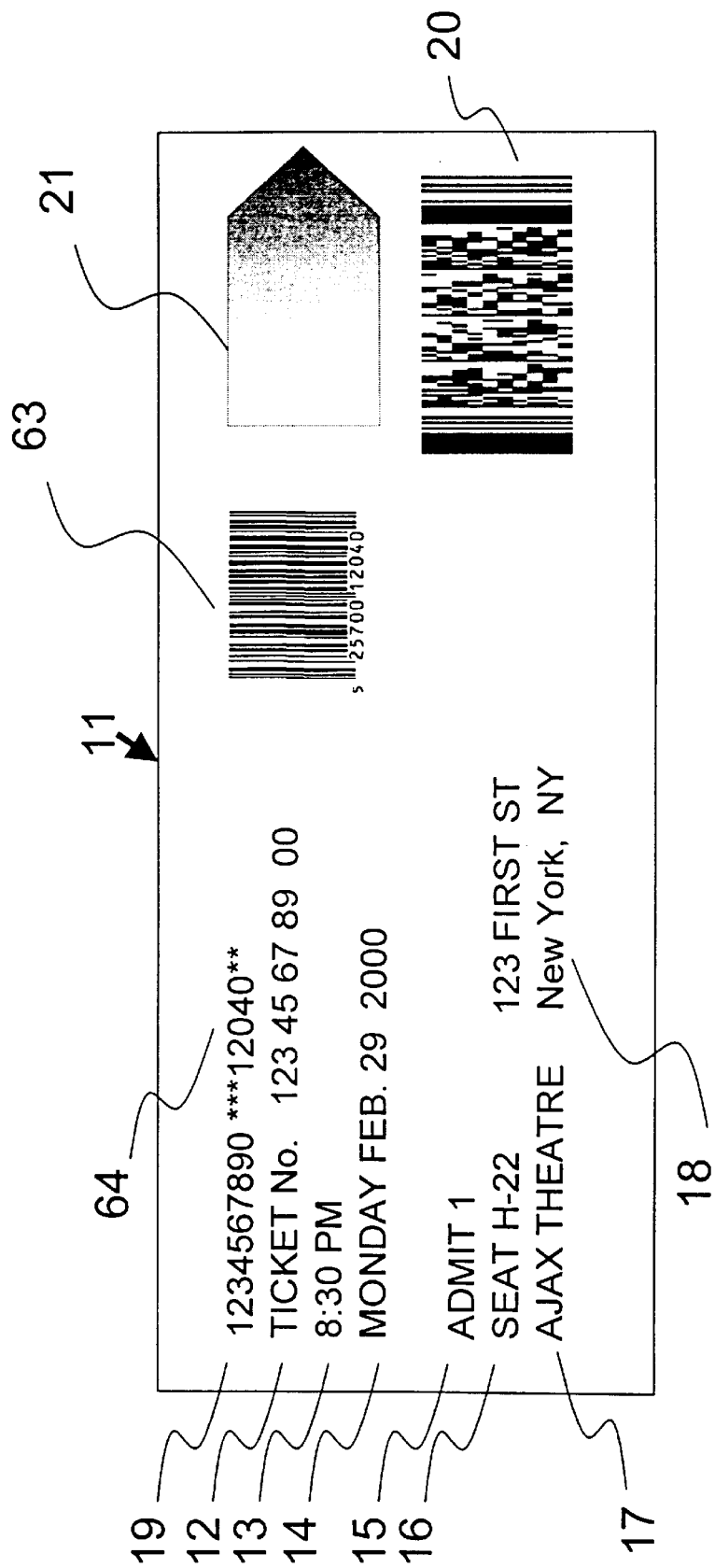
FIG. 1 is a drawing of an electronic ticket having a graphic field or tell.

Referring now to the drawings in detail, and more particularly to FIG. 1, the reference character 11 represents an electronic ticket that may be used for admission to any place, service, or event that current tickets allow admission. Electronic ticket 11 may have been produced by a printer coupled to a computer or by a printer of an electronic postage meter or automatic teller machine (ATM) printer. Ticket 11 includes: a serial number 12, the time 13 of the event the ticket holder is entitled to admission, the date of the event 14, the number of people designated to admit, or the names of the people allowed admission 15, the ticket holder(s) seat number 16, the name of the place of the event 17, the address of the event 18, a unique number 19 that represents a computer record, a bar code 20, which may be a two dimensional encrypted bar code i.e., the PDF417 standard developed by Symbol Technologies Inc. of Bohemia, N.Y., a graphic field or tell 21, a proof code or bar code 63 that represents the printer settings (printer manufacturer, model no., resolution, density, etc.) of the printer that printed ticket 11 and a numeric number 64 that represents the printer settings (printer manufacturer, model no., resolution, density, etc) of the printer that printed ticket 11. Bar code 20 contains in coded form: the name of the place of the event 17, the address of the event 18, and a unique number 19. Bar code 63 and number 64 may be encrypted. Bar code 63 and number 64 may also be used to validate the printer that prints ticket 11.

Figure 2:
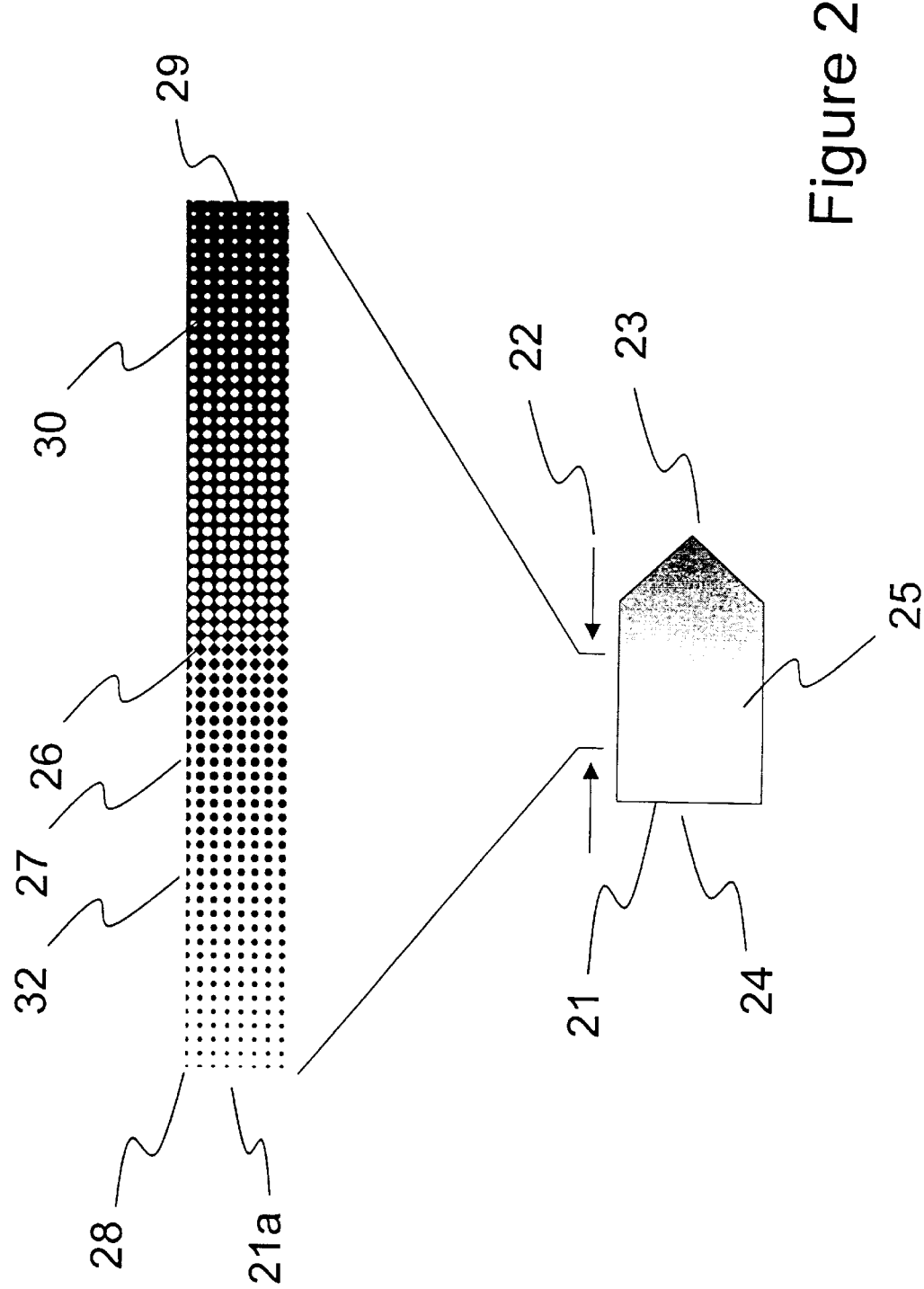

FIG. 2 is a drawing of graphic field 21 or tell 21 of FIG. 1 and an enlarged version of graphic field 21 that becomes graphic field 21a. Graphic field 21 or tell 21 is a variable half tone screen print that is designed to appear black at its edge 23, near white at its right edge 24, and shades of gray in region 25. Section 22 of graphic field 21 is an enlarged version of region 25. Section 22 shows the effect of varying the black printed spots 26 and white background 27. White background 27 decreases in size from edge 28 to edge 29.

Within region 30, white background 27 becomes completely surrounded by black spots 26. Within region 32, white background 27 appears to increase in size as one approaches edge 28.

Half toning is the process used to produce graphic field 21. Half toning is a technique that is used by printers to represent a gray scale image on a bi-level (black and white) page. Half toning breaks up an image into spots of varying sizes to simulate the original image. The human eye perceives a shade of gray depending on the percentage of ink coverage. Black and white laser and ink jet computer printers use ink or toner of only one blackness. Therefore, to produce various shades of gray to reproduce a continuous gray scale image, the image is broken into a series of spots. Varying the spot sizes approximates the shades of gray.

Thus, a group of large spots placed closely together appears black. A group of smaller spots with larger spaces between them produces a pale gray shade. A group of even smaller black spots spaced widely apart would appear almost white.

Graphic field 21 consists of a continuously varying tone area. Field 21 is a field where the range of tone has been pre-selected to provide a continuum of spots that slowly vary from small white backgrounds with large black spots to small black spots on a white background. "Small" is defined as being below the resolution limit of the human eye. When printed by a laser or ink jet printer, graphic field 21 appears black at its edge 23, near white at its edge 24, and shades of gray in region 25.

Figure 3:
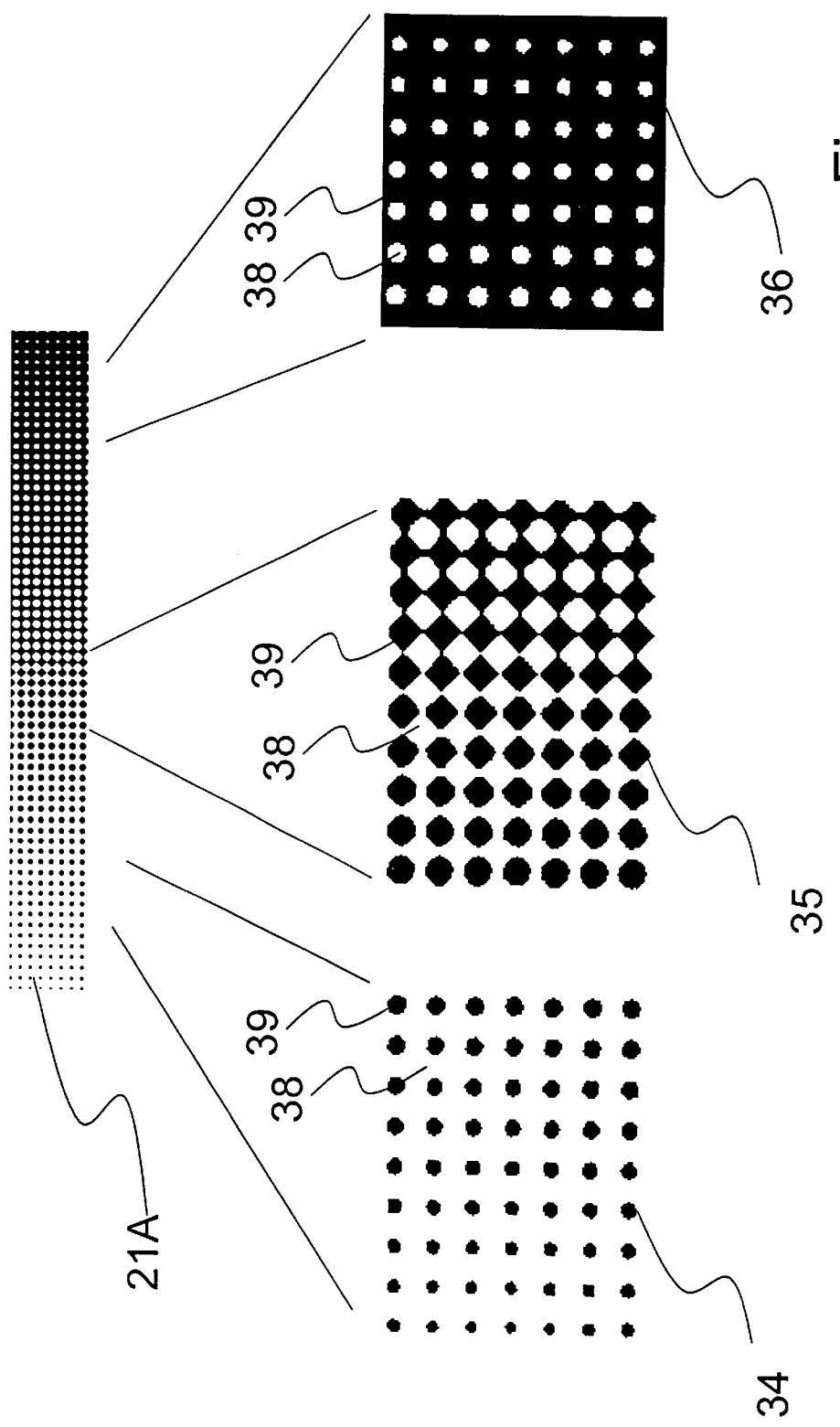

FIG. 3 is a drawing showing graphic field 21a and segments 34, 35 and 36 that make up an enlarged version of graphic field 21a. Within region 36, white background 38 becomes completely surrounded by black spots 39. Within region 35, white background 39 appears as white open areas at its left edge and white squares at its right edge. Within region 34, white background 38 completely surrounds varying size black spots 39.

Figure 4:
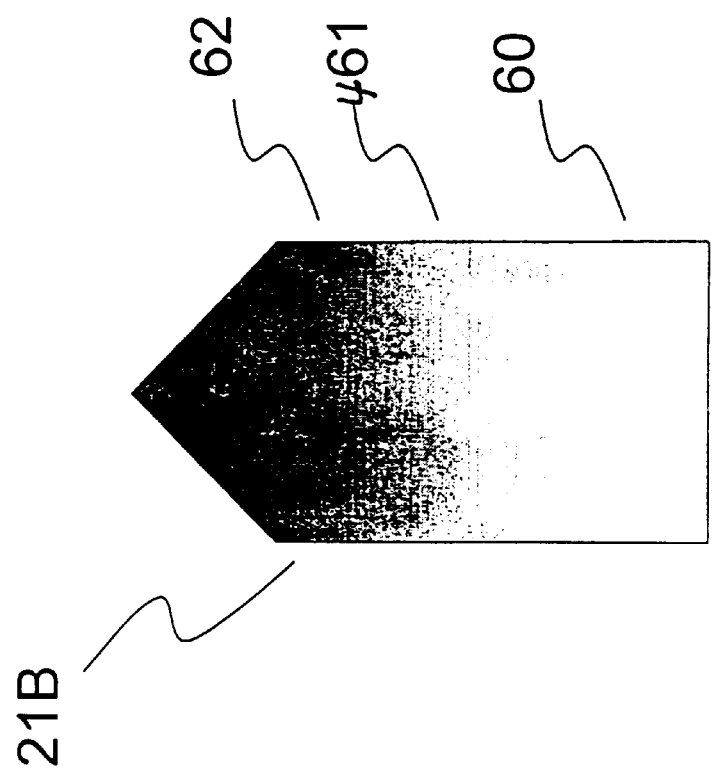
FIG. 4 is a drawing showing graphic field 21 and how graphic field 21 would be distorted by the photocopying and/or scanning/printing processes to look like graphic field 21B.
Figure 4:
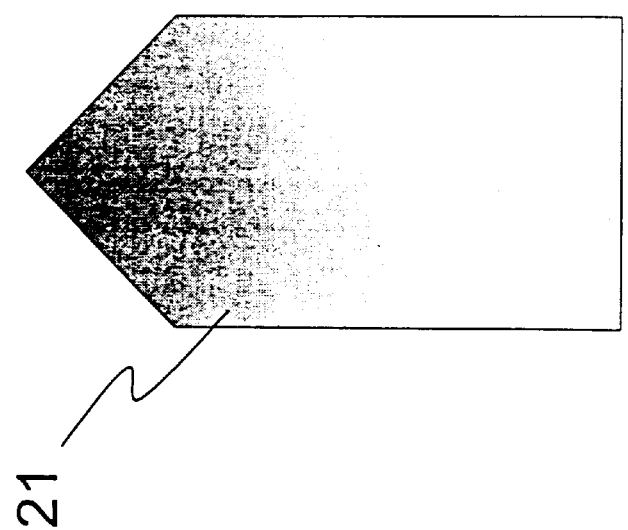

FIG. 4 is a drawing showing graphic field 21 and how graphic field 21 would be distorted by the photocopying and/or scanning/printing process to look like graphic field 21B. The original print tone of graphic field 21 is uniform gray gradient. When graphic field 21 is photocopied and/or scanned/printed, graphic field 21B will vary from black to white. Graphic field 21B will have visible bands 60, a mottled area 461 and an expanded black tone area 62. Thus, graphic field 21 does not look the same as graphic field 21B.

Laser and ink jet printers would print graphic field 21 as described in the description of FIGS. 2 and 3. The aforementioned printers are designed in such a manner that when they print graphic field 21, graphic field 21 appears to the average human eye to be free of objectionable variation. The printers are not concerned with how a photocopy and/or how a scanned/printed copy of graphic field 21 would look. However, the non-linear reproduction characteristics of a photocopier and/or a scanner/printer will magnify these non-perceivable, process-produced variations in graphic field 21 and produce graphic field 21B. The peculiarities of the human eye further magnify the now visible process errors. The errors manifest themselves as mottled area 461 in graphic field 21B, where in region 25 of graphic field 21 a smooth gray tone exists.

Figure 5:
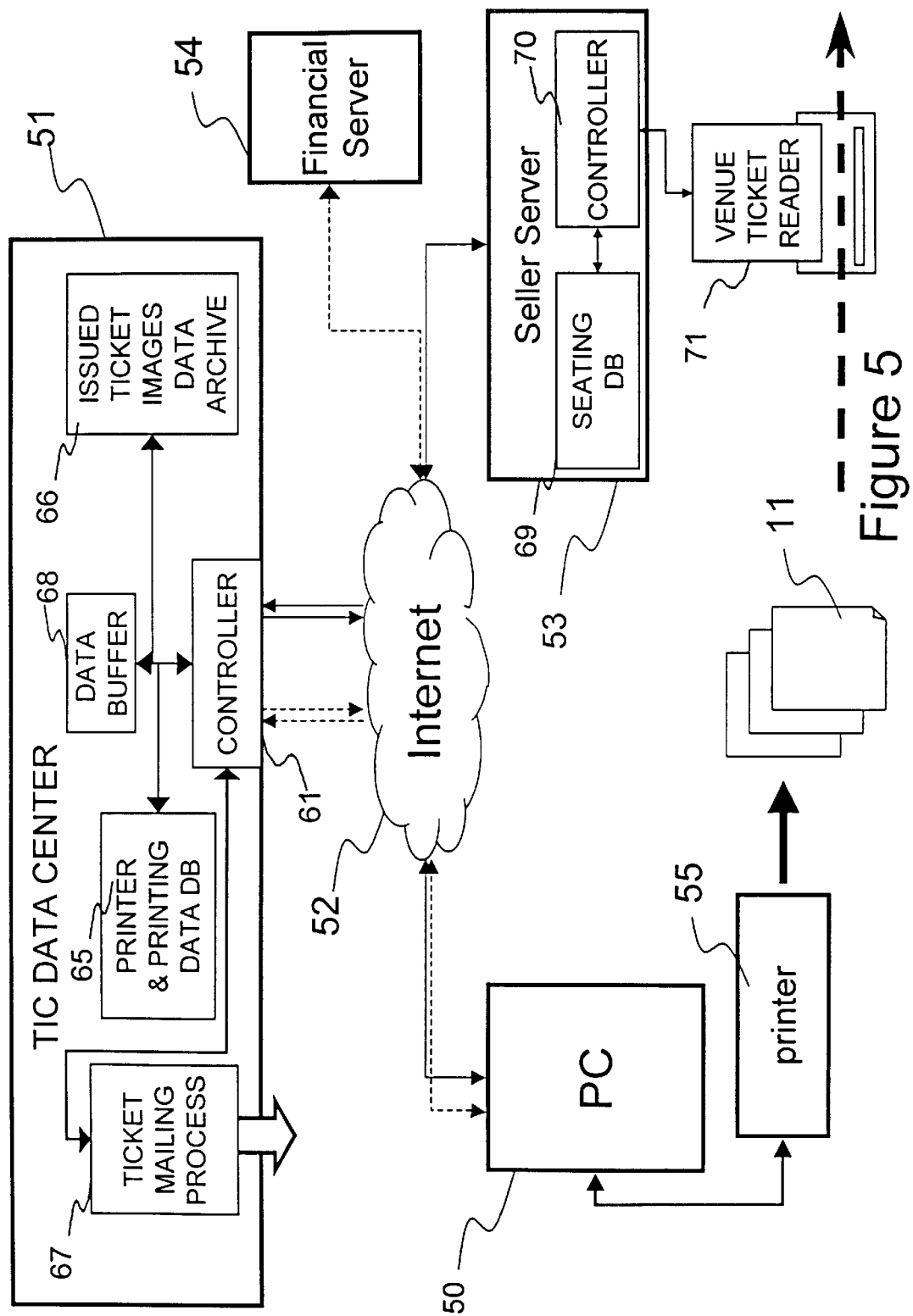
FIG. 5 is a drawing showing how tickets may be purchased over the Internet.

FIG. 5 is a drawing showing how tickets may be purchased over the Internet. A purchaser wishing to obtain an electronic ticket, inputs information through input device 50, which may be a personal computer, or a non-intelligent terminal device, or any other suitable input device, to ticket image control data center 51 via internet 52. Data center 51 includes a printer and printing data base 65; an issued ticket images data archive 66 that is coupled to data base 65; a controller 67 that is coupled to data base 65, archive 66, and ticket mailing process 67; and a venue seat data base 68 that is coupled to controller 67. Data base 65 contains a list of printers which may successfully print graphic field 21 and the parameters required for each printer to print graphic field 21. Archive 66 stores the issued tickets in accordance with the unique number assigned to each ticket. Controller 67 is used to control the ticket image production and reproduction of ticket 11, and venue seat data base 68 contains the seats that are being processed for delivery for each event. Ticket mailing process 67 is used if printer 55 can not print acceptable tickets 11.

Data center 51 communicates with a ticket seller server 53 via internet 52 to obtain information as to the availability of suitable events consistent with what the purchaser desires. Server 53 will handle all the specifics that the ticket entitles one to receive. Server 53 will also handle the payment for the ticket, i.e., credit card. Server 53 includes a seating data base 69 and a controller 70 that is coupled to data base 69. Seating data base 69 contains the seat assignments for each specific event, i.e., the 3:00 P.M. performance at theater 17. Controller 70 controls the seating process for booking over internet 52 and provides a look up for venue ticket reader 71. Reader 71 may be a bar code or optical reader that is used to read and validate the information on ticket 11. Server 53 also communicates with financial server 54 and data center 51 to validate payment information. If the purchaser wants to purchase the ticket(s) that server 53 has available at the price specified by server 53, and server 54 is satisfied with the purchaser's credit, server 53 will inform data center 51 of these facts. Data center 51 will compose ticket 11. Data center 51 will download to computer 50 the purchased ticket(s). Personal computer printer 55 (laser, ink jet, facsimile machine) will print ticket(s) 11.

Graphic field 21 or tell 21 will be printed on ticket 11 as shown in FIG. 1. If ticket 21 is reproduced by photocopying and/or scanning/printing, graphic field 21 will display a mottle image 461, as shown in FIG. 4. Thus, a ticket agent will be able to visualize when a ticket is a copy.

Figure 6:
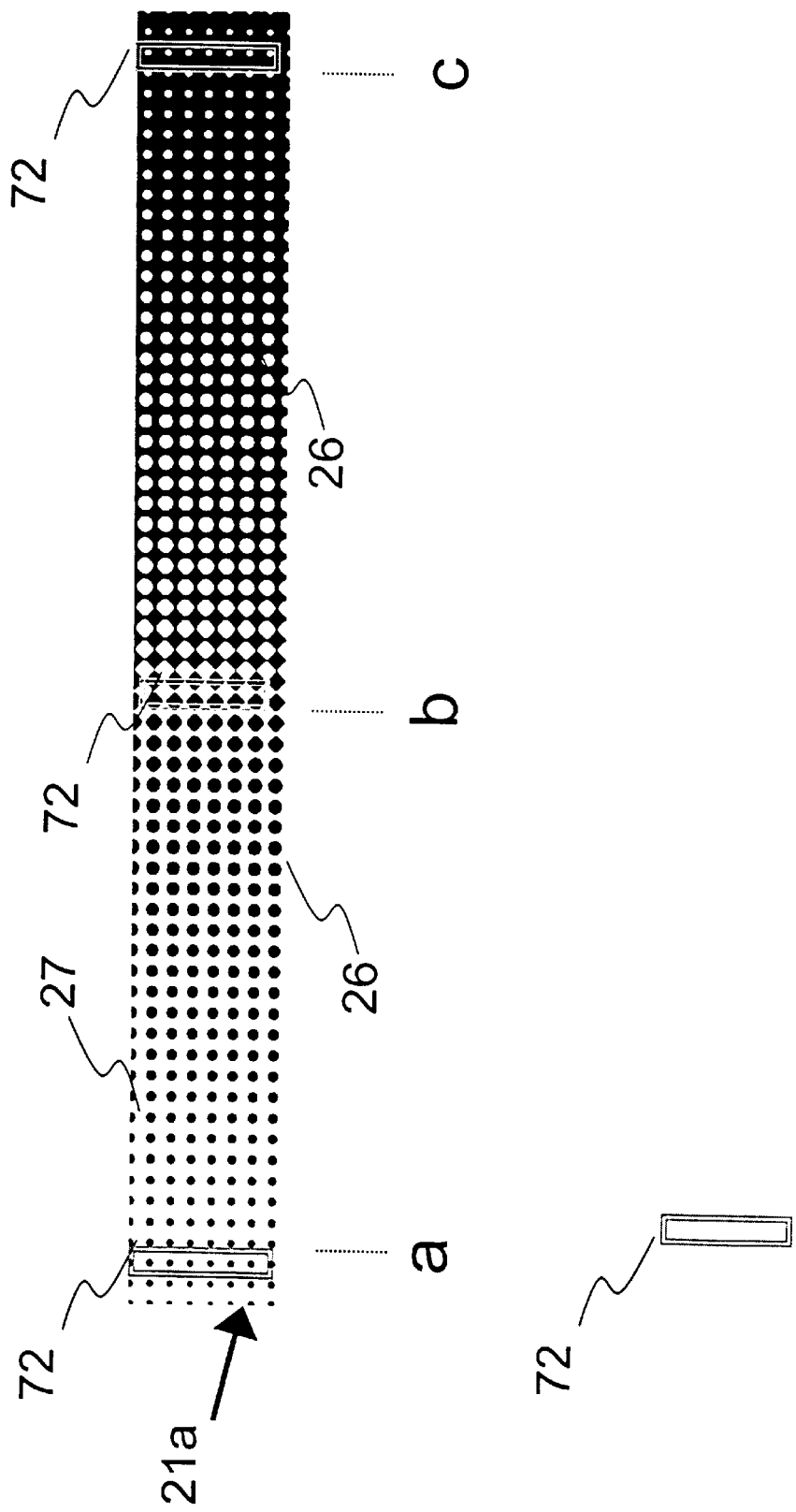
FIG. 6 is a drawing showing graphic field 21a and the scanning aperture 72 of reader 71 of FIG. 5.

FIG. 6 is a drawing showing graphic field 21a and the scanning aperture 72 of reader 71 of FIG. 5. The width of aperture 72 is equal to the pitch of the black printed spots 26 pattern, and the length of scan aperture 72 is equal to at least ten times the pitch of the black printed spots 26 pattern. Aperture 72 is shown in positions a, b, and c. In position a, the area of white background 27 dominates the active area of aperture 72; and, in position c, the black printed spots 26 area dominates the active area of aperture 72. In position b, the black printed spots 26 area approximates the area of white background 27 in the active area of aperture 72.

Figure 7:
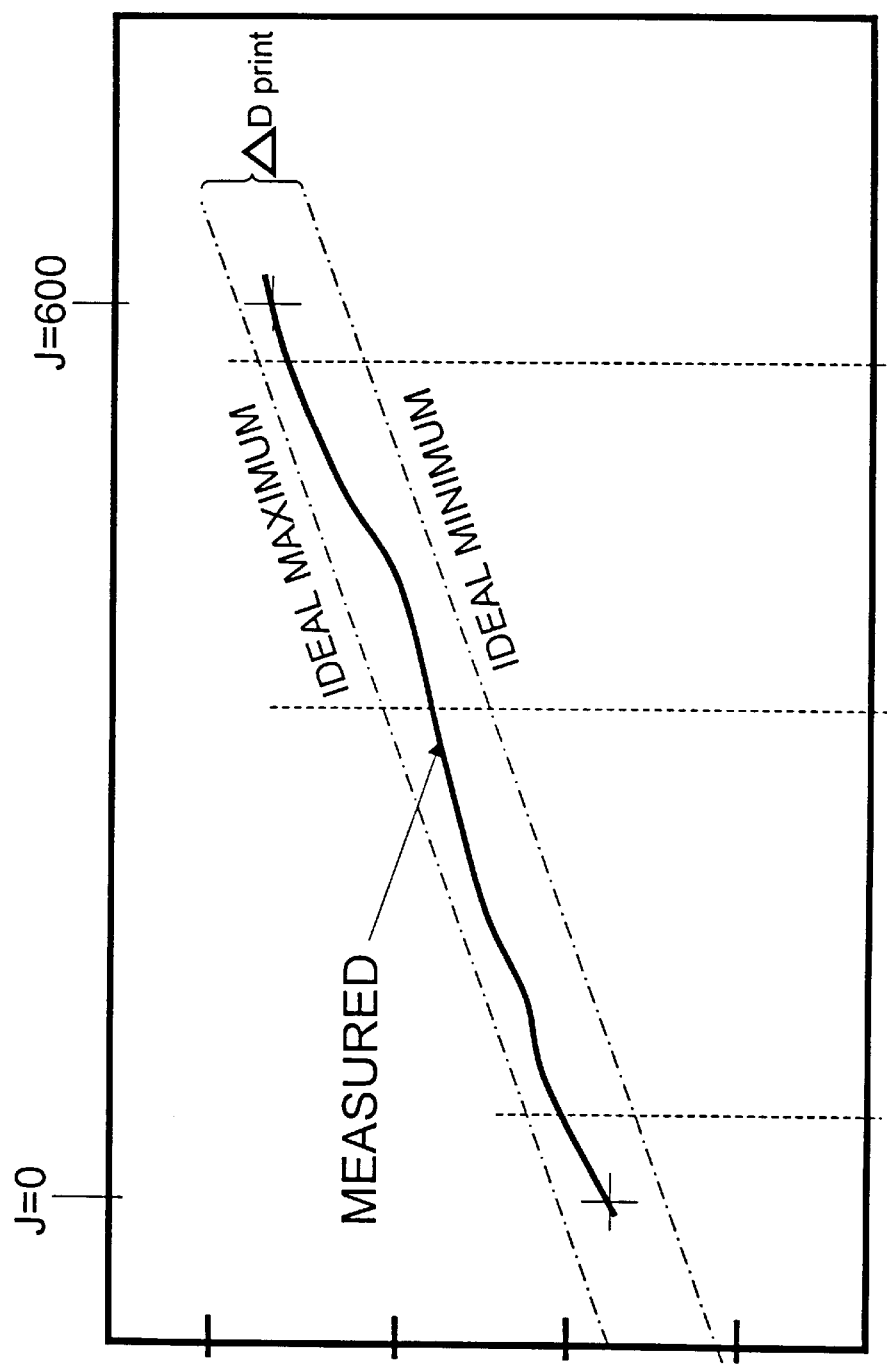
FIG. 7 is a graph showing the measured average print density signal from scanning a valid graphic field 21 pattern vs. the position of aperture 72.

FIG. 7 is a graph showing the average measured print density signal from scanning a valid graphic field 21 pattern vs. the position of aperture 72. Due to variations in the paper, ink, etc. that are used for ticket 11 (FIG. 1), the actual measured value for the density of spots 26 will be between the ideal minimum and ideal maximum lines shown in the graph depicted in FIG. 7. The difference between the ideal maximum and ideal minimum lines (delta D) varies from printer to printer. For a printer printing at 300 dots per inch as shown in FIG. 7, there are 600 measured points between J=0 and J=600.

Figure 8:
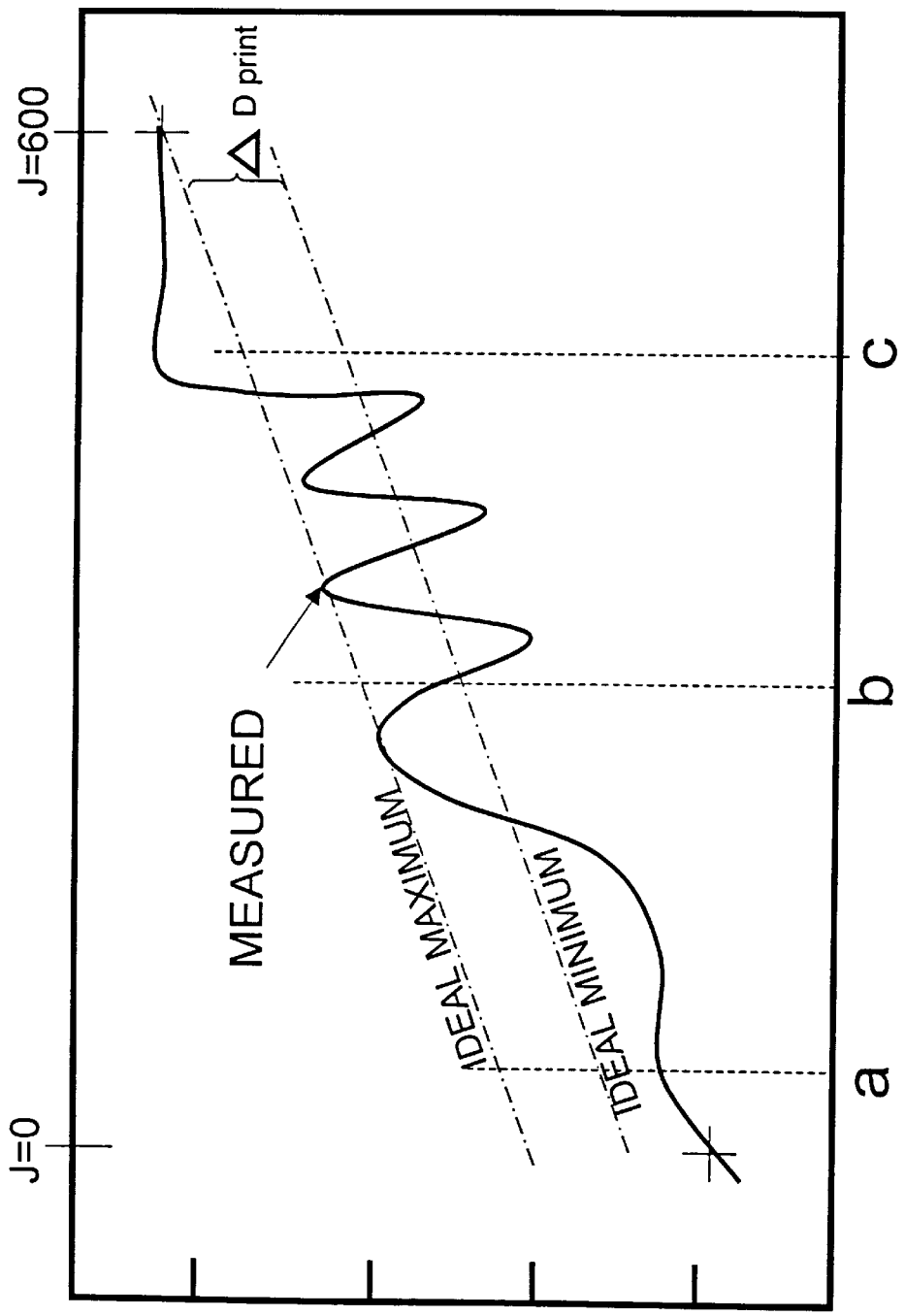
FIG. 8 is a graph showing the measured print density signal from scanning a copied graphic field 21 B pattern vs. the position of aperture 72.

FIG. 8 is a graph showing the measured print density signal from scanning a copied graphic field 21 B pattern vs.

the position of aperture 72. In the region between position a and position b of aperture 72, the measured signal is usually below the ideal minimum values and sometimes within the correct range. In the region between position b and position c, the measured signal varies with the position of aperture 72, i.e., the measured density moving in and out of the ideal range. In position c, the measured signal is above the ideal range. For a printer printing at 300 dots per inch as shown in FIG. 8, there are 600 measured points between J=0 and J=600.

Figure 9:
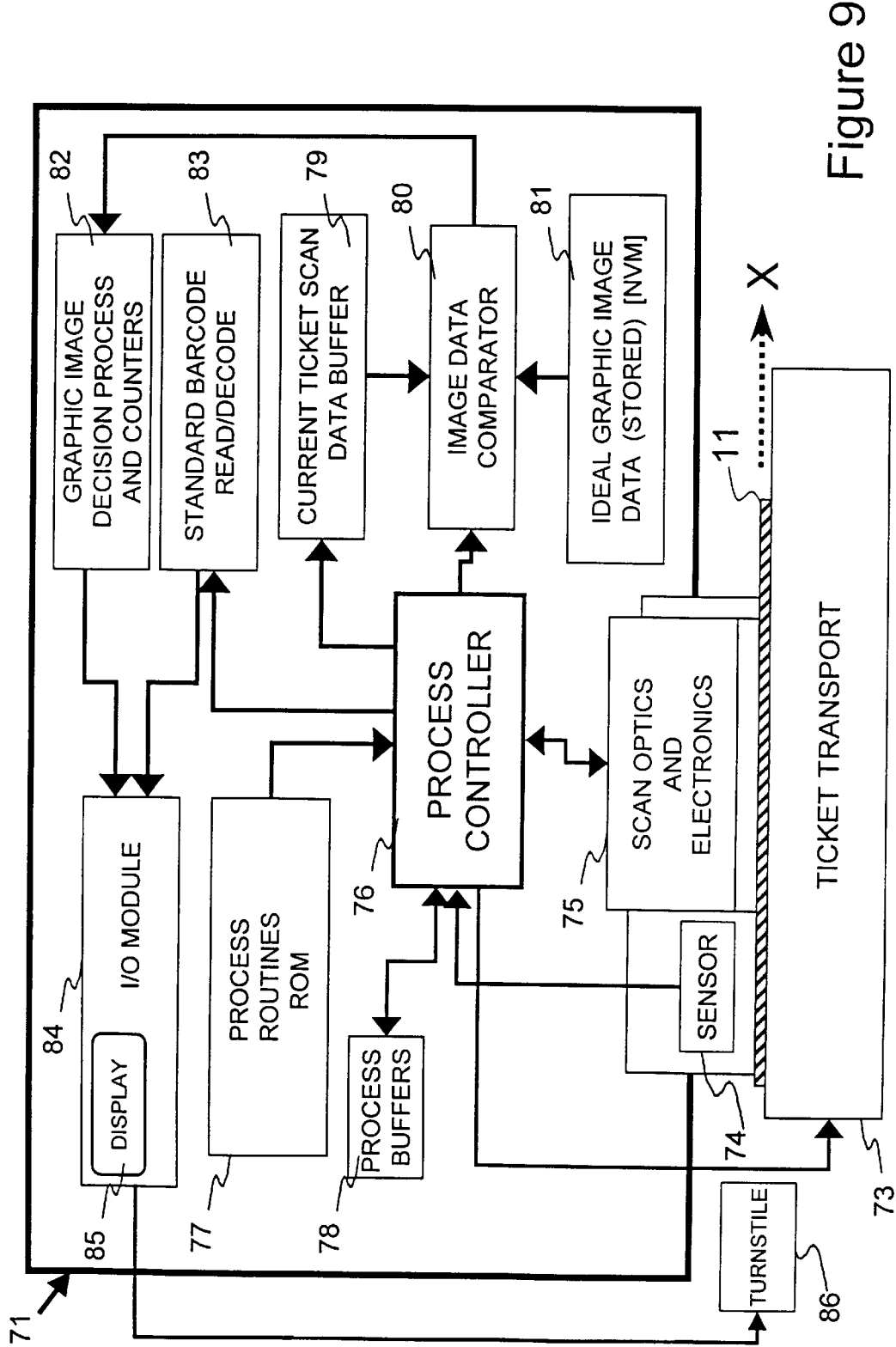
FIG. 9 is a drawing of scanner 71 in greater detail.

FIG. 9 is a drawing of scanner 71 in greater detail. Scanner 71 includes process controller 76; sensor 74 that is coupled to processor controller 76; scan optics and electronics 75 that are coupled to processor controller 76 and to ticket transport 73; process routines read only memory 77 that is coupled to process controller 76; process buffers 78 that are coupled to process controller 76; current ticket scan data buffer 79 that is coupled to process controller 76; image data comparator 80 that is coupled to process controller 76 and to current ticket scan data buffer 79; ideal graphic image data non volatile memory 81; and standard bar code read/decode 83 that is coupled to process controller 86. Scan optics and electronics 75 may be the SE 3223 Scan Engine manufactured by Symbol Technologies Inc. of Bohemia, N.Y.

Sensor 74 detects the presence of ticket 11 in ticket transport 73. Ticket transport 73 moves ticket 11 in direction X in a manner that ticket 11 moves under scan optics and electronics 75. Process controller 76 (the operation which will be described in the description of FIGS. 10 and 11) accesses the routines in process routines read only memory 77 and process buffers 78. Process buffers 78 are used to store intermediate data read by scan optics and electronics 75.

After scan optics and electronics 75 has read graphic field 21 and bar code 63, the information stored in buffers 78 is further processed by the routines stored in read only memory 77. Then the foregoing information is transmitted to current ticket scan data buffer 79. Process controller 76 then causes the standard bar code read/decode 83 to read and decode the information contained in bar code 63. Comparator 80 compares each data point stored in current ticket scan data buffer 79 with the ideal graphic image data stored in nonvolatile memory 81. Bar code 63 identifies the settings of the authorized printer that is allowed to print graphic field 21. Comparator 80 transmits its results to graphic image decision process and counters 82.

Counters 82 determine whether or not graphic field 21 is genuine. Controller 76 causes the output of counters 82 and the output of standard bar code read/decode 83 to be transmitted to I/O module 84. Module 84 allows display 85 to display the results of the comparison of bar code 63 and graphic field 21. Thus, display 85 will indicate that ticket 11 is genuine or not genuine. Module 84 also activates the opening of turnstile 86. Module 84 transmits and receives data to and from controller 70 of server 53 (FIG. 5).

Figure 10:
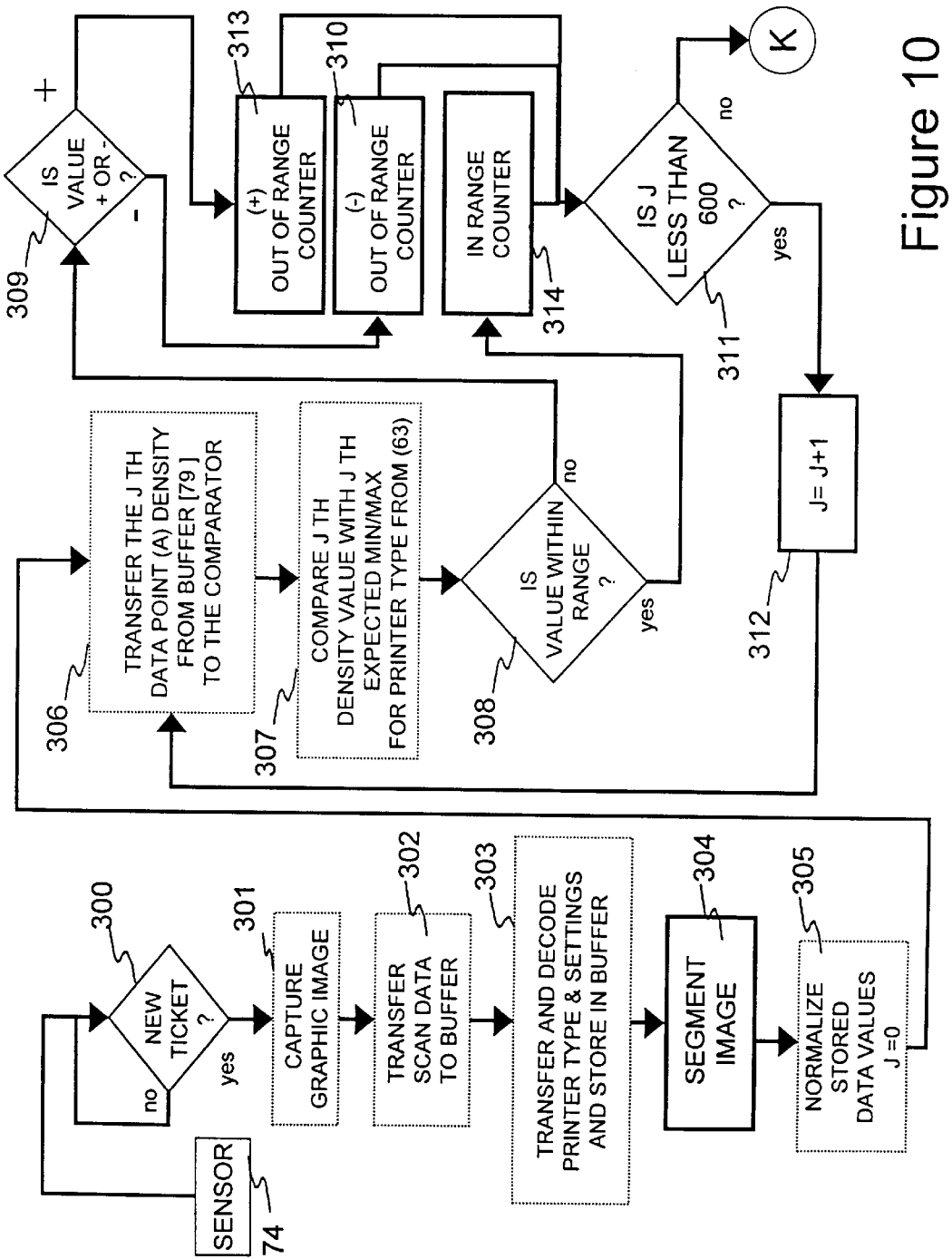
FIGS. 10 and 11 is a flow chart showing the processes that are run by controller 76 of FIG. 9.
Figure 11:
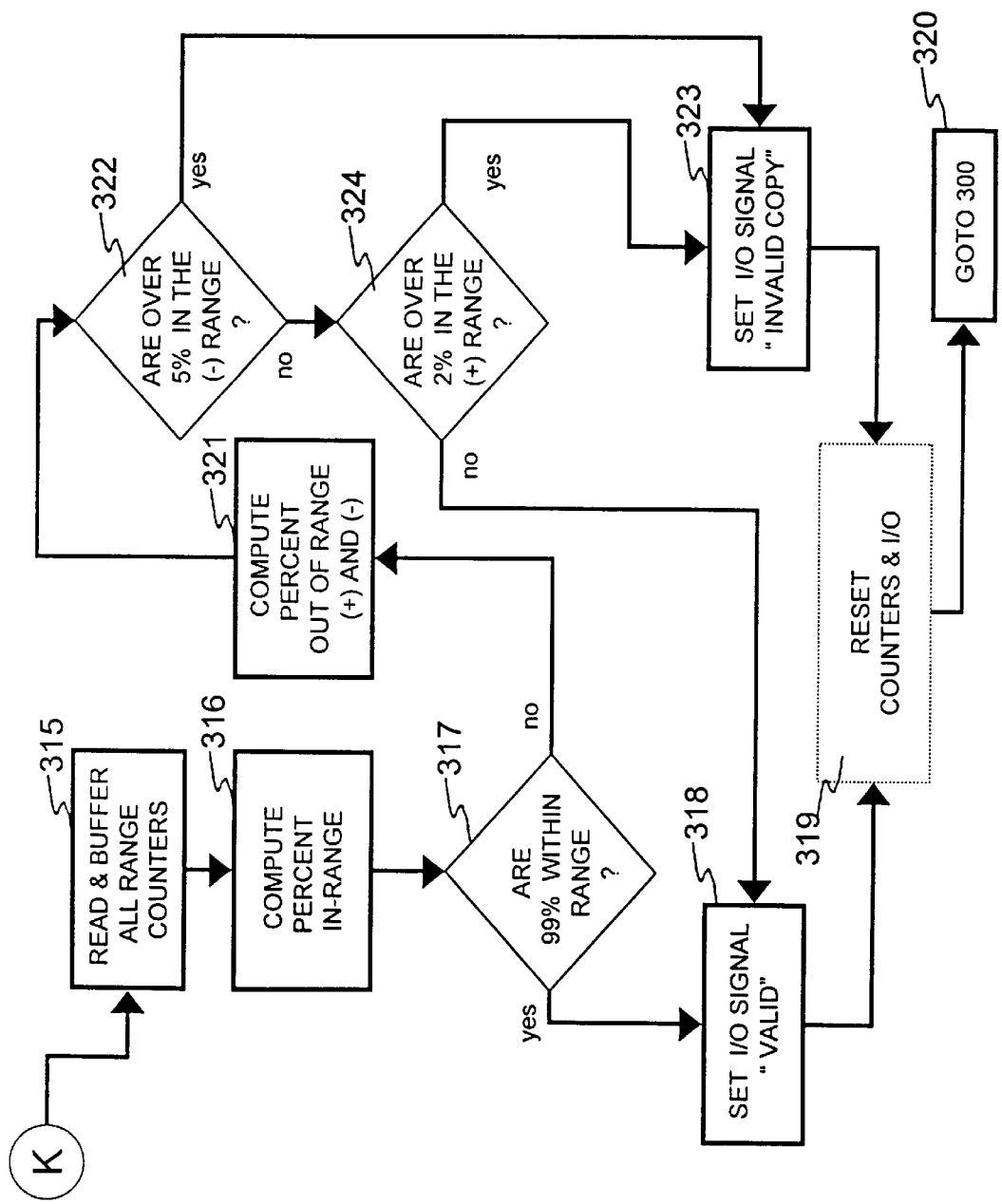

FIGS. 10 and 11 is a flow chart showing the processes that are run by controller 76 of FIG. 9. The program begins in decision block 300 (FIG. 10). Decision block 300 determines whether or not sensor 74 has sensed the presence of ticket 11 in transport 73. If block 300 determines that sensor 73 has not sensed the presence of ticket 11 in transport 73, the program goes back to the input of block 300. If block 300 determines that sensor 73 has sensed the presence of a ticket 11 in transport 73, the program goes to block 301 to capture the image of graphic field 21. Then the program goes to block 302 to transfer the captured image of graphic field 21 to current ticket scan data buffer 79.

Now the program goes to block 303 to read bar code 63, decode the printer type and settings indicated in bar code 63 and store the decoded information in data buffer 79. Then the program goes to block 304 to segment the image of graphic field 21. At this point, the program goes to block 305 to normalize the stored image of graphic field 21 and set the location (J) value of the first data point of the stored image of graphic field 21 to zero. J is a scan number. Now the program goes to block 306 to transfer the Jth data point of the measured density from buffer 79 to comparator 80. Then the program goes to block 307 to compare the Jth value with the Jth expected ideal minimum and expected ideal maximum values stored in nonvolatile memory 81.

At this point the program goes to decision block 308. Block 308 determines whether or not the compared Jth value is between the expected ideal minimum and expected ideal maximum values stored in nonvolatile memory 81. If block 308 determines that the compared Jth value is not between the expected ideal minimum and expected ideal maximum values stored in nonvolatile memory 81, then the program goes to the input of decision block 309. Block 309 determines whether or not the compared value is greater than the range or less than the range. If block 309 determines that the compared value has a value less than a permissible range value, the program goes to negative out of range counter 310. Then the program goes to the input of decision block 311. If block 309 determines that the compared value has a value greater than a permissible range value, the program goes to positive out of range counter 313. Then the program goes to the input of decision block 311. If block 308 determines that the compared Jth value is between the expected ideal minimum and expected ideal maximum values stored in nonvolatile memory 81, the program goes to in range counter block 314. Then the program goes to the input of decision block 311.

Decision block 311 determines whether or not J is less than 600. If block 311 determines that J is less than 600, the program goes to block 312 to set J=J+1. Then the program goes back to the input of block 306. If block 311 determines that J is not less than 600, the program goes to block 315 (FIG. 11) to read buffer 78 and range counters 310, 313 and 314. Now the program goes to block 316 to compute the percent of values that are in range, i.e., between the ideal minimum and ideal maximum lines shown in FIG. 7.

At this point the program goes to decision block 317. Block 317 determines whether or not the computed values are 99 percent within range. If block 317 determines that the computed values are 99 percent within range, the program goes to block 318 to cause I/O module 84 to display a valid indication on display 85. Then the program goes to block 319 to reset range counters 310, 313 and 314 and to reset I/O module 84. Now the program goes to block 320 and then to the input of block 300. If block 317 determines that the computed values are not 99 percent within range, the program goes to block 321 to compute the percent of values that are greater than the permissible range and the percent of values that are less than the permissible range.

Now the program goes to decision block 322. Block 322 determines whether or not the computed value is 5% over the permissible negative range. If block 322 determines that the computed value is 5% over the permissible negative range, the program goes to block 323 to cause I/O module 84 to display an invalid indication on display 85. Then the program goes to block 319 to reset range counters 310, 313 and 314 and to reset I/O module 84. Now the program goes to block 320 and then to the input of block 300. If block 322 determines that the computed value is not 5% over the permissible negative range, the program goes to decision block 324.

Block 324 determines whether or not the computed value is 2% over the permissible positive range. If block 324 determines that the computed value is not 2% over the permissible positive range, the program goes to block 318 to cause I/O module 84 to display a valid indication on display 85 and/or activate turnstile 86. If block 324 determines that the computed value is 2% over the permissible positive range, the program goes to block 323 to cause I/O module 84 to display an invalid indication on display 85. Then the program goes to block 319 to reset range counters 310, 313 and 314 and to reset I/O module 84. Now the program goes to block 320 and then to the input of block 300.

The above specification describes a new and improved method for automatically reading electronic tickets. It is realized that the above description may indicate to those skilled in the art additional ways in which the principles of this invention may be used without departing from the spirit. Therefore, it is intended that this invention be limited only by the scope of the appended claims.

What is claimed is:

1. A method for printing and reading electronic tickets, comprising the steps of:

printing a graphic field on the ticket that will change in appearance when the ticket is either reproduced by either scanning/printing and/or photocopying, reading the graphic field while storing characteristics of printing settings that are printed on a ticket in the form of a bar code of a printer that printed the graphic field; and interpreting the graphic field to determine whether or not the graphic field has been reproduced by scanning/printing and/or photocopying wherein the interpreting step further includes the steps of:

calculating ideal minimum and maximum ideal density values for the printer that printed the graphic field;

comparing the calculated values with the read values; and determining if the read values are between the minimum and maximum ideal density values.

2. The method claimed in claim 1, wherein the graphic field is a continuum of spots that slowly vary from small white backgrounds with large black spots to small black spots on a white background.

3. The method claimed in claim 1, wherein the scanning/printing and/or photocopying process will produce mottle in a gray zone in the graphic field.

4. The method claimed in claim 1, wherein the scanning/printing and/or photocopying process will produce bands in the graphic field.

5. The method claimed in claim 1, wherein the electronic ticket may be ordered over the Internet.

6. The method claimed in claim 1, wherein the graphic field is a plurality of detectable half tone gray steps when printed by a personal computer printer.

7. The method claimed in claim 6, wherein the detectable half tone gray steps comprise:

a plurality of black spots on a white background.

8. The method claimed in claim 7, wherein the reading step further includes the steps of:

scanning the graphic field with an aperture;

collecting signals from the scanned graphic field; and storing the collected signals.

9. The method claimed in claim 8, wherein the width of the aperture includes a plurality of black spots and associated white background.

10. The method claimed in claim 8, wherein the length of the aperture includes one black spot and associated white background.

11. The method claimed in claim 1, wherein the printing settings are printed on the ticket.

12. The method claimed in claim 11, wherein the printing settings are encrypted.

13. The method claimed in claim 1, further including the step of:

displaying a message indicating that the read values are between the minimum and maximum ideal density values.

14. The method claimed in claim 1, further including the step of:

displaying a message indicating that most of the read values are between the minimum and maximum ideal density values.

15. The method claimed in claim 1, further including the step of:

displaying a message indicating that the read values are not between the minimum and maximum ideal density values.

16. The method claimed in claim 1, further including the step of:

displaying a message indicating that some of the read values are not between the minimum and maximum ideal density values.

17. The method claimed in claim 1, further including the step of activating the opening of a turnstile if the read values are between the minimum and maximum ideal density values.

* * * * *